Dec. 3, 1935.                H. S. JANDUS ET AL                2,023,078
                                   BUMPER
                            Filed March 31, 1933
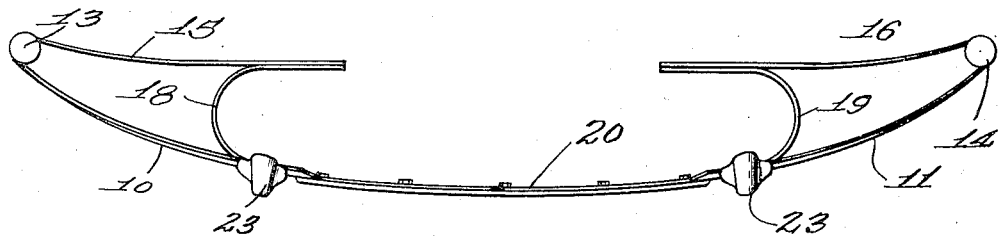
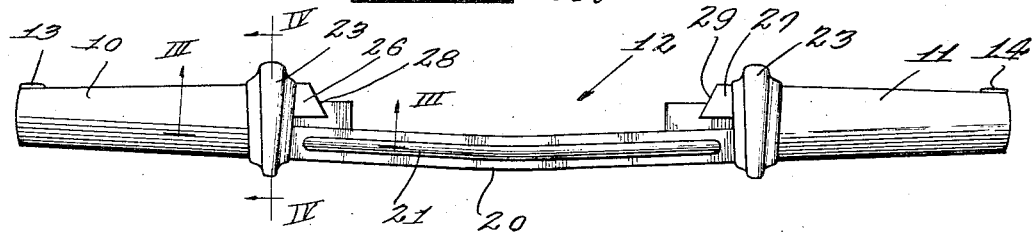
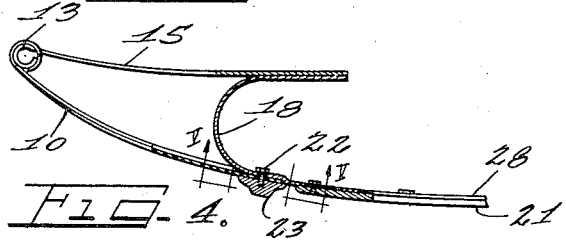   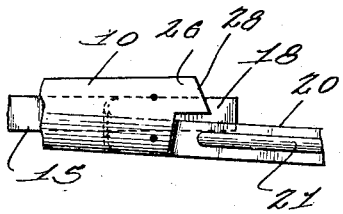
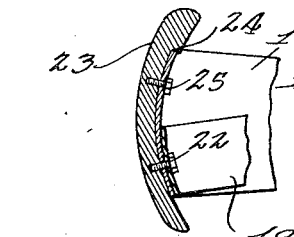   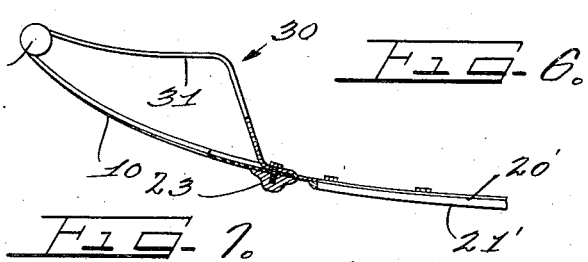
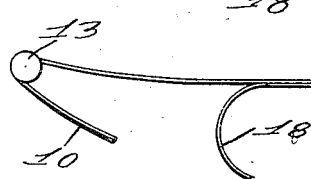
Inventors
HERBERT S. JANDUS,
BLADEN M. SHORT.

Patented Dec. 3, 1935

2,023,078

UNITED STATES PATENT OFFICE 2,023,078

BUMPER

Herbert S. Jandus and Bladen M. Short, Detroit, Mich., assignors to General Spring Bumper Corporation, Detroit, Mich., a corporation of Michigan Application March 31, 1933, Serial No. 663,679

7 Claims. (Cl. 293—55)

This invention relates to an automobile bumper and more particularly to an automobile bumper especially adapted for use at the front of an automobile.

An object of this invention is to provide a bumper of simple construction wherein there are two spaced impact bar sections with a gap between them and back bar means for bridging the gap and for connecting the inner extremities of the impact bar sections.

Another object of this invention is to provide an improved automobile bumper of simple construction and yet of sufficient rigidity and stability to withstand the shock and strain to which the bumper may be exposed in use.

In accordance with the general features of this invention there is provided an automobile bumper including spaced impact bar sections with a gap between them and back bar means for supporting and connecting the sections and including a forwardly offset longitudinally extending reinforcing strip between the inner extremities of the impact bar sections and suitably anchored to the inner extremities by clamping devices.

Another feature of the invention relates to the provision of clamping means for the bumper which extends upwardly and downwardly beyond the impact bar sections so as to assist in preventing another bumper from overriding the bumper of our invention when the same is attached to an automobile.

Other objects and features of this invention will more fully appear from the following detailed description taken in connection with the accompanying drawing which illustrates several embodiments thereof and in which Figure 1 is a plan view of a bumper embodying this invention;

Figure 2 is a front view of the bumper shown in Figure 1;

Figure 3 is a fragmentary sectional view taken on the line III—III of Figure 2 looking in the direction indicated by the arrows;

Figure 4 is an enlarged fragmentary sectional view taken on the line IV—IV of Figure 2 looking in the direction indicated by the arrows and illustrating the cross sectional construction of one of the clamping devices;

Figure 5 is a fragmentary view taken on the line V—V of Figure 3 looking in the direction indicated by the arrows and showing the bumper with a clamping plate removed;

Figure 6 is a fragmentary sectional view similar to Figure 3 illustrating a slight modification of the invention and Figure 7 is a fragmentary view somewhat similar to Figure 1 illustrating a modified form of the invention in which the back bar structure includes a continuous strip at the back of the bumper extending from one extremity of the bumper to the other.

The reference characters 10 and 11 indicate spaced impact bar sections in which there is a gap designated by the reference numeral 12. The outermost extremities of these two impact bar sections 10 and 11 terminate in the usual terminal or hinge barrels 13 and 14 in which corresponding back bar strips 15 and 16 respectively also terminate.

While in the preferred form of the invention illustrated in Figures 1 to 5 inclusive we have illustrated the back bar in the form of two sections 15 and 16, this back bar may also be made in the form of a single continuous strip such as the strip designated by the reference numeral 17 disposed between the terminal barrels and illustrated in Figure 7. With this exception the form of the invention shown in Figure 7 is identical with the preferred form, and for that reason the same reference numerals are being used in Figure 7 to designate parts common to both modifications of the invention.

At this time it should be noted that while the bumpers illustrated in the accompanying drawing may be made of any suitable material, they are preferably made of steel of sufficient resiliency to enable the bumpers to properly respond to the strains and shocks to which they are exposed while in use.

In order to tie the impact bar sections 10 and 11 together, we have provided a back bar structure including the strips 15 and 16 of such construction that a part of it is offset forwardly to bridge the gap 12 between the sections 10 and 11 and to connect these sections together at the front part of the bumper. We shall now proceed to describe in detail this structure.

Secured to the back strips 15 and 16 are spaced and oppositely opposed U-shaped braces. The rear leg of the brace 18 is secured to the back strip 15 by any suitable means and this leg, together with the inner extremity of the strip 15, is adapted to be secured in the usual way to one of the bumper supporting members on the vehicle. Similarly the rear leg of the U-shaped brace 19 is secured to the inner extremity of the back strip 16 and it, together with the inner extremity of the back strip, is adapted to be secured to the other supporting member on the vehicle for the bumper.

The front legs of the two braces 18 and 19 are connected by a common strip 20 which is offset forwardly as shown in Figure 3 so as to bridge the gap 12 between the inner extremities of the two impact bar sections 10 and 12. This connecting strip 20 has secured to its outer surface in any suitable manner such for example as by bolts an ornamental and reinforcing bead like strip 21 which is clearly shown in Figures 2 and 3. Also, the strip 20 is slightly bowed downwardly at its midsection so as to enhance the appearance of the bumper.

It will also be noted from Figure 3 that the forward leg or portion of each of the braces 18—19 is secured to the corresponding inner extremity of the associated impact bar section by means of bolt 22 which extends through the impact bar section and is threaded into a clamping device 23. This clamping device or plate, as best shown in Figure 4, is of curved vertical cross section and is notched at 24 to engage over the upper edge of the corresponding impact bar section. Furthermore, the impact bar section is fastened to the clamping member 23 adjacent the notch portion 24 by means of a bolt 25 (Fig. 4).

The two spaced clamping member 23—23, in addition to defining the extremities of the gap 12, also serve to materially enhance the appearance of the front of the bumper. Moreover, each of these clamping members 23 is formed to project above and below the corresponding impact bar section to aid in preventing another bumper from overriding or slipping under the bumper of our invention when it is secured to an automotive vehicle.

In order to further enhance the appearance of the front of the bumper, the impact bar sections 10 and 11 have inwardly projecting extensions 26 and 27 which have oppositely diverging slanting edges 28 and 29 respectively.

In Figure 6 there is illustrated a modification of the invention in which the back bar structure is in the form of a single continuous strip designated generally by the reference character 30. In illustrating this form of the invention, it will be perceived from Figure 6 that a view similar to Figure 3 is shown. This view illustrates only a half of a bumper inasmuch as the other half is substantially the same as the other half illustrated. Furthermore, parts common to this form of the invention and that described in Figures 1 to 5 inclusive, are designated by the same reference numerals as were employed in describing the preferred form of the invention.

The back bar structure embodying the single strip 30 terminates at its extremities in the usual terminal barrels, such as the barrels 13 and 14. The front impact bar sections of this modified form of the invention are the same as the impact bar sections 10 and 11 previously described.

The back bar strip 30 at each end embodies an angular portion 31, one end of which terminates in the corresponding barrel and the other end of which is secured to the clamping plate 23 in the same manner as the braces were secured to the clamping plates 23 in the preferred form of the invention. Positioned between the angular portions 31 of this back bar strip 30 is a forwardly offset strip 20' corresponding to the strip 20 of the preferred form of the invention. This strip 20' bridges the gap between the impact bar sections and has secured to it an ornamental bead strip 21' corresponding to the bead strip 21.

It will be appreciated from the foregoing description of this modification of the invention that it differs primarily from the previously described form of the invention in that the forwardly offset strip 20' is integral with the back bar means at each end of the bumper. This structure is slightly cheaper to manufacture than the structure shown in Figures 1 to 5 for the reason that it embodies a single strip back bar structure, whereas the preferred form of the invention embodies three strips of material.

Now we desire it understood that although we have illlustrated and described in detail the preferred embodiments of the invention, the invention is not to be thus so limited but only insofar as defined by the scope and spirit of the appended claims.

We claim as our invention:

1. In a vehicle bumper, spaced impact bar sections, a rear bar structure connected to said sections for supporting the same and having a portion offset forwardly in a position bridging the space between and constituting substantially a continuation of the inner extremities of said sections, and shield means arranged at the junctures of said portion and extremities to protect said junctures.

2. In a vehicle bumper, spaced impact bar sections, a rear bar structure connected to said sections for supporting the same and having a portion substantially narrower than said sections and offset forwardly in a position bridging the space between said sections, and an ornamental, protective and reinforcing bead secured to the outer face of said portion.

3. In a vehicle bumper, spaced impact bar sections, a rear bar structure connected to said sections for supporting the same and having a portion offset forwardly in a position bridging the space between said sections, and shield means arranged at the junctures of said portion and extremities to protect said junctures, said means extending substantially beyond the impact sections transversely thereof to prevent overriding by another bumper.

4. In a vehicle bumper, a pair of aligned horizontally spaced impact bars, and a rear bar structure connected to said bars for supporting the same in alignment and having a portion offset forwardly in line with and fastened to the inner extremities of said bars and bridging the space between and constituting substantially a continuation of the inner extremities of said bars, the ends of said portion being turned back behind said portion and toward each other.

5. In a vehicle bumper, a pair of aligned horizontally spaced impact bars, and a rear bar structure connected to said bars for supporting the same in alignment and having a portion offset forwardly in line with and fastened to the inner extremities of said bars and bridging the space between and constituting substantially a continuation of the inner extremities of said bars, said portion having its ends turned rearwardly away from said bars and back behind said portion so as to provide transverse bracing means between another part of the back bar structure and each of said bars.

6. In a vehicle bumper, a pair of aligned horizontally spaced impact bars, and a rear bar structure connected to said bars for supporting the same in alignment and having a front portion substantially narrower than said bars and offset forwardly in alignment with and bridging the space between and constituting substantially a continuation of the inner extremities of said bars and fastened to said extremities of said bars, and spaced means concealing said fastenings so as to provide the front of the bumper with a one-piece appearance.

7. In a vehicle bumper, spaced impact bar sections, a supporting structure connected to said sections for supporting the same and including a portion substantially narrower than said sections and disposed forwardly in a position bridging the space between said sections, and an ornamental, protective and reinforcing bead secured to the outer face of said portion.

HERBERT S. JANDUS.
BLADEN M. SHORT.